(12) United States Patent
Tsai

(10) Patent No.: US 7,445,231 B1
(45) Date of Patent: Nov. 4, 2008

(54) HANDCART WITH FOLDABLE HANDLE STRUCTURE

(75) Inventor: Chun-Sheng Tsai, Taichung County (TW)

(73) Assignee: Yewe Yih Enterprise Co., Ltd., Taichung (TW)

( * ) Notice: Subject to any disclaimer, the term of this patent is extended or adjusted under 35 U.S.C. 154(b) by 9 days.

(21) Appl. No.: 11/797,176

(22) Filed: May 1, 2007

(51) Int. Cl.
*B62B 1/04* (2006.01)

(52) U.S. Cl. ............... 280/655; 280/639; 280/43.1; 280/47.17; 280/47.27; 16/429

(58) Field of Classification Search ............ 280/639, 280/651, 652, 654, 655, 655.1, 659, 43.1, 280/47.17, 47.24, 47.27, 47.29; 16/233, 16/235, 113.1, 408, 429
See application file for complete search history.

(56) References Cited

U.S. PATENT DOCUMENTS

| | | | | |
|---|---|---|---|---|
| 3,992,038 A * | 11/1976 | Guadano, Sr. | ............... | 280/659 |
| 4,401,319 A * | 8/1983 | Kazmark | ................... | 280/655 |
| 5,439,239 A * | 8/1995 | Su | ................... | 280/40 |
| 5,468,005 A * | 11/1995 | Yang | ................... | 280/40 |
| 6,616,174 B2 * | 9/2003 | Bierma | ................... | 280/655 |
| 6,789,809 B2 * | 9/2004 | Lin | ................... | 280/47.25 |
| 7,044,484 B2 * | 5/2006 | Wang | ................... | 280/47.27 |
| 7,387,306 B2 * | 6/2008 | Zimmer | ................... | 280/47.29 |

\* cited by examiner

*Primary Examiner*—Christopher Ellis
*Assistant Examiner*—John D Walters
(74) *Attorney, Agent, or Firm*—Muncy, Geissler, Olds and Lowe, PLLC

(57) ABSTRACT

A handcart with a foldable handle structure comprises a handle structure formed of a holder segment and a frame pivotally coupled to each other. The lower ends of the frame are pivotally coupled to a block board and a pair of wheels. A pair of position-limiting sleeves wraps the tubes of the holder segment. When the handcart is in use, the position-limiting sleeves are pulled down to wrap the pivotal joints between the holder segment and the frame to confine the handle structure to a straight line. Then, the user can hold the handle and push the handcart forward. When not in use, the position-limiting sleeves are pushed up to reveal the pivotal joints between the holder segment and the frame, and the holder segment can thus be folded down. Thereby, the volume of the handcart can be reduced to facilitate storage or convenience lifting the handcart to carry about.

6 Claims, 4 Drawing Sheets

HANDCART WITH FOLDABLE HANDLE STRUCTURE

FIELD OF THE INVENTION

The present invention relates to a handcart, particularly to a foldable handle structure, whereby the height of a handcart can be reduced.

BACKGROUND OF THE INVENTION

Refer to FIG. 1 for a conventional small-size handcart used to carry small-volume goods. The conventional handcart comprises an L-shape cart body 1 formed of a pair of metallic tubes. The lower side of the cart body 1 has a block board 2. The block board 2 and the cart body 1 form an L shape. A handle 3 extends from the upper side of the cart body 1. The user holds the handle 3 to push the handcart forward. The bottom face of the lower side of the handcart has a pair of wheels 4. When the user holds the handle 3 and tilts the cart body 1, goods can be placed on the front side of the cart body 1 and supported by the block board 2. Thus, the user can push the handcart to carry the goods.

When the handcart is not is use, it is placed in storage or leans against a wall. The handcart had better be erected lest too much space be occupied. However, the cart body 1 is unfoldable and has an appreciable height. When the handcart leaning against the wall is bumped, it will abruptly roll out by the wheels 4 and fall on the ground. Therefore, a conventional handcart is hard to store up and implies a danger.

Based on many years' experience in fabricating and selling the related products, the Inventor has been persistently devoted to the research and improvement of handcarts and finally proposes the very useful present invention herein.

SUMMARY OF THE INVENTION

The primary objective of the present invention is to provide a handcart with a foldable handle structure. The handle structure includes a holder segment and a frame, and the holder segment is pivotally coupled to the frame. The holder segment is formed of a pair of parallel tubes respectively arranged at the left and the right and a horizontal connection rod connecting with the pair of tubes to form an inverse-U shape. The lower ends of the frame are pivotally coupled to a block board and a pair of wheels. The block board can be rotated up to contact the front side of the frame. The wheels can be rotated inward to fold up within the frame. Two tubed position-limiting sleeves wrap the tubes of the holder segment. When the handcart of the present invention is in use, the position-limiting sleeves are pulled down to wrap the pivotal joints between the holder segment and the frame to confine the handle structure to a straight line. Then, the user can hold the handle and push the handcart forward. When the handcart of the present invention is not in use, the position-limiting sleeves are pushed up to reveal the pivotal joints between the holder segment and the frame, and the holder segment can thus be folded down. Thereby, the volume of the handcart can be reduced to facilitate storage or convenience lifting the handcart with a hand to carry about.

DETAILED DESCRIPTION OF THE PREFERRED EMBODIMENTS

Figure 1:
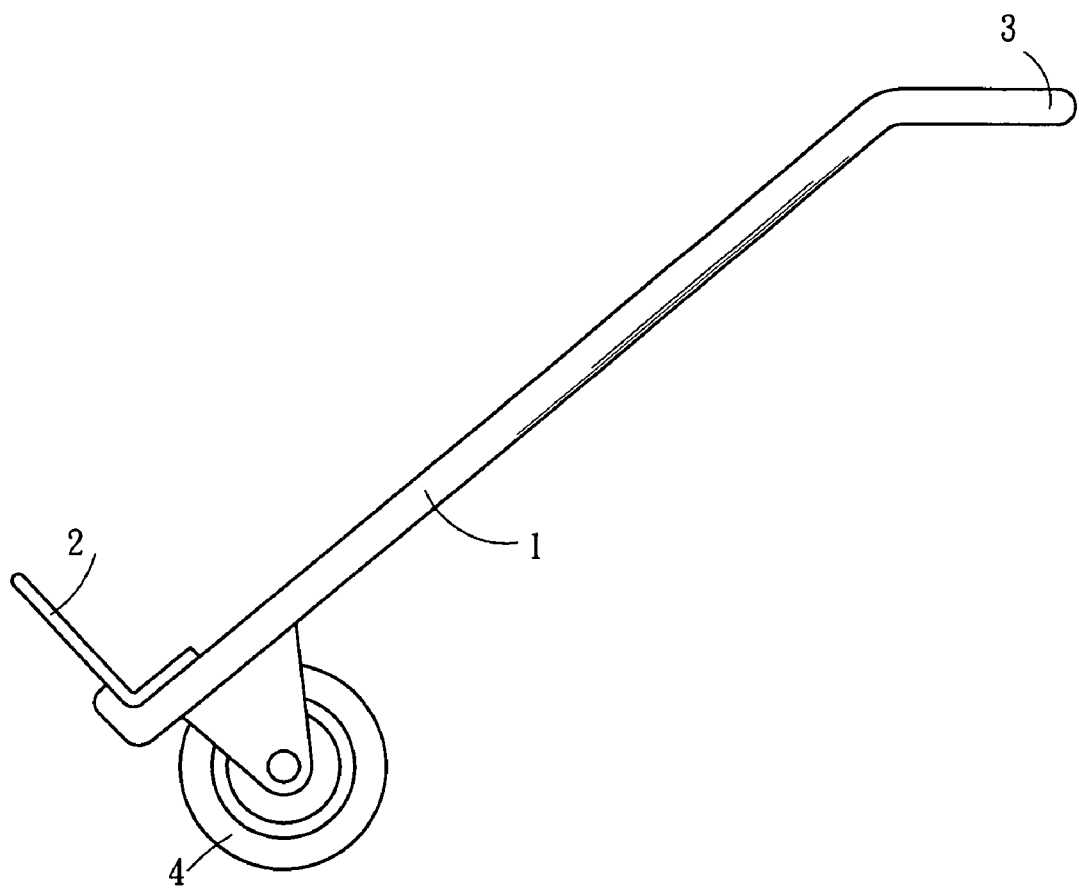
FIG. 1 is a side view of a conventional handcart.
Figure 2:
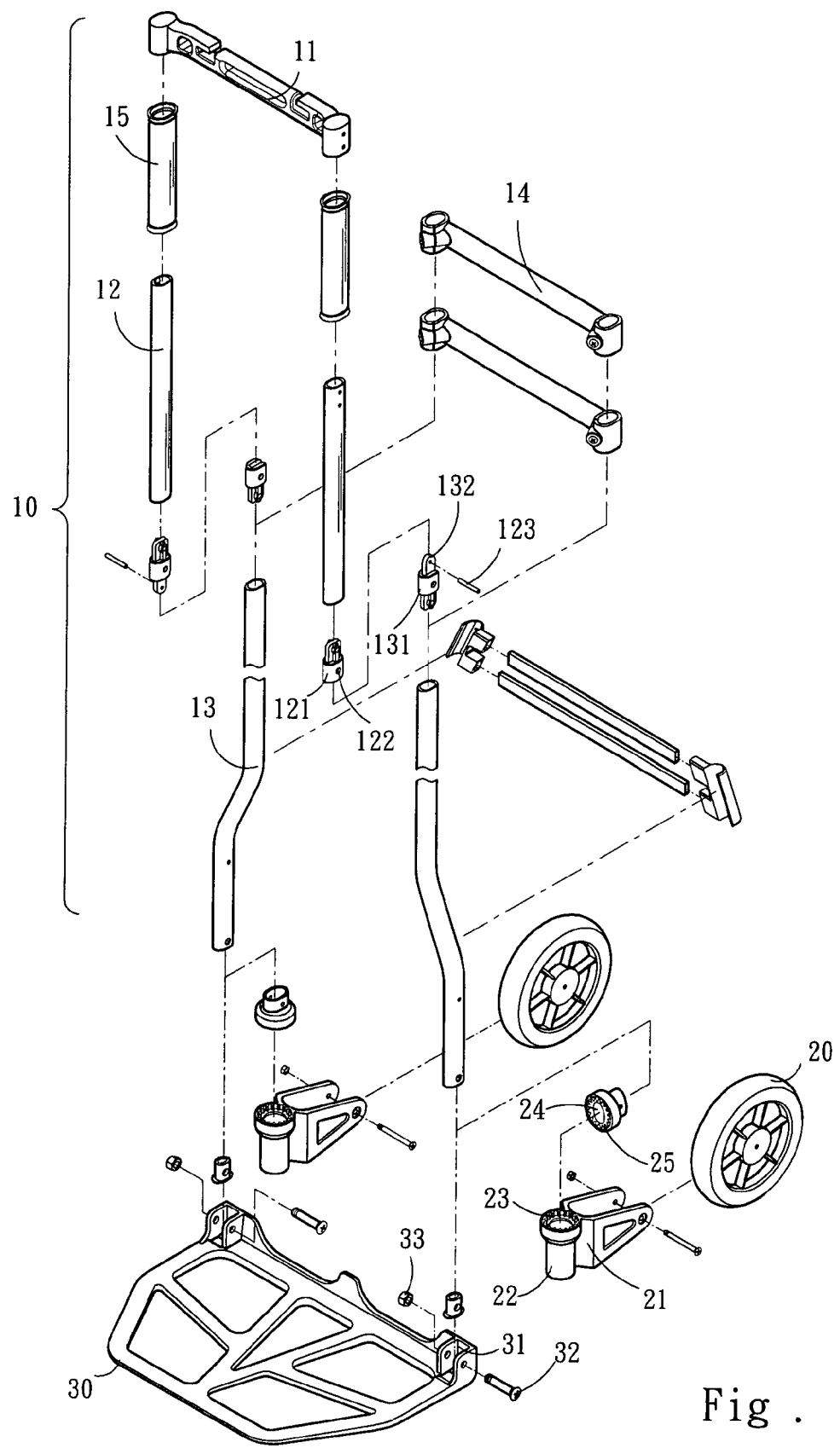
FIG. 2 is an exploded view of the handcart according to a preferred embodiment of the present invention.
Figure 3:
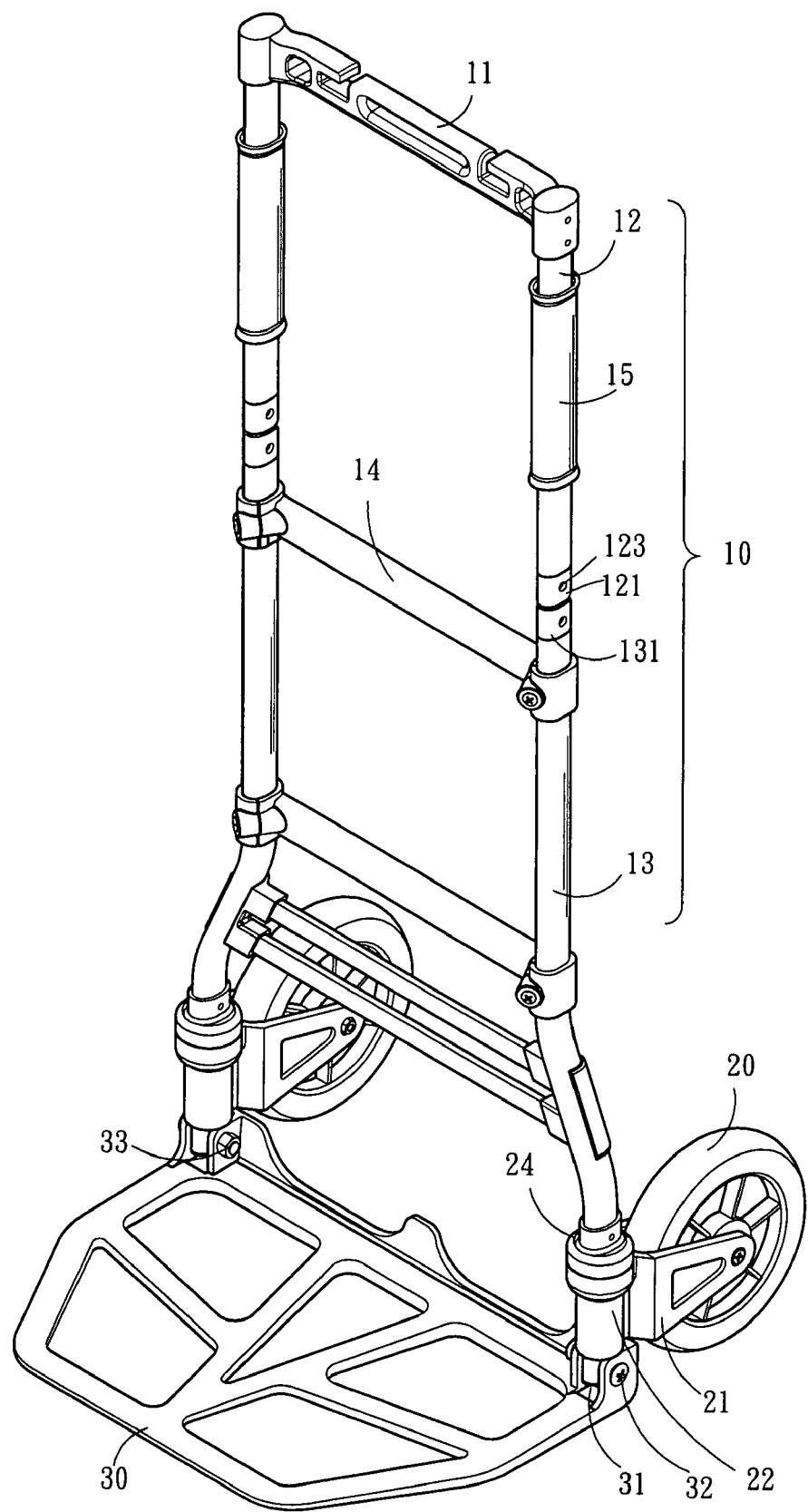
FIG. 3 is a perspective view of the handcart according to a preferred embodiment of the present invention.
Figure 4:
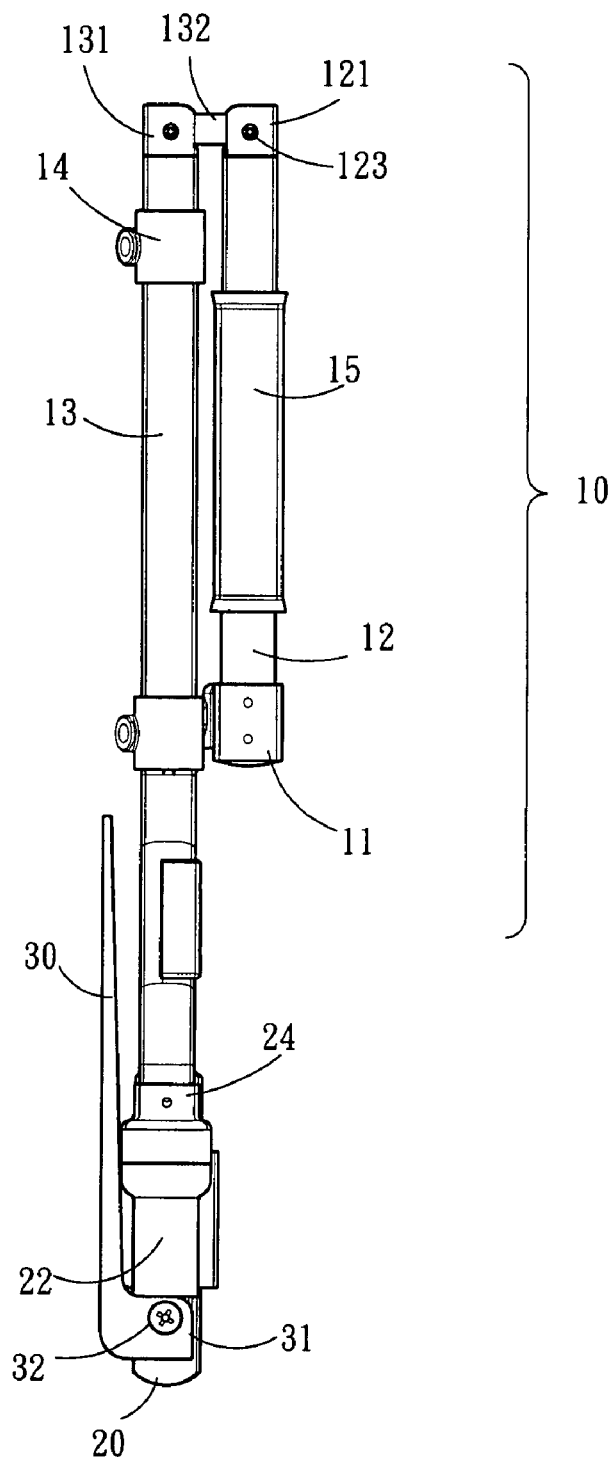
FIG. 4 is a side view of the folded handcart according to a preferred embodiment of the present invention.

Refer to FIG. 2 and FIG. 3. The handcart with a foldable handle structure of the present invention comprises the following components: a handle structure 10, two horizontal rods 14, two position-limiting sleeves 15, a pair of wheels 20, and a block board 30.

The handle structure 10 includes a holder segment 12 and a frame 13. The holder segment 12 has an inverse-U shape and is formed of a pair of parallel tubes respectively arranged at the left and the right and a horizontal connection rod 11 connecting with the pair of tubes to form the inverse-U shape. The cross section of the tube has an elliptic shape.

In one side, the bottom of the tube of the holder segment 12 sleeves a plug element 121. The lower portion of the plug element 121 expands to have a dimension greater than the upper portion and has a slot thereinside. A pivotal hole 122, which is to be inserted by a bolt 123, horizontally passes through the lower portion of the plug element 121.

The frame 13 is formed of a pair of tubes. The cross section of the tube of the frame 13 has an elliptic shape. The top opening of the tube of the frame 13 sleeves a pivotal element 131. The top of the pivotal element 131 is pivotally coupled to a rotary plate-like insert element 132. The insert element 132 is inserted into the slot of the plug element 121. The plug element 121 is pivotally coupled to the pivotal element 131 by the bolt 123. Thus, the handle structure 10 can be folded toward the frame 12.

In the other side, the plug element 121 is reversed and sleeved by the top opening of the tube of the frame 13 at this side, and the pivotal element 131 is also reversed and sleeved by the bottom of the tube of the holder segment 12 at this side.

The left and right sides of each horizontal rod 14 respectively sleeve the left and right tubes of the frame 13 and are respectively secured to the left and right tubes of the frame 13.

The inner contour of the position-limiting sleeves 15 matches the shape of the tube of the holder segment 12 to annularly wrap the tube. The position-limiting sleeves 15 can be moved downward to wrap the plug element 121 and the pivotal element 131.

Each wheel 20 is pivotally coupled to a wheel seat 21 horizontally. One side of the wheel seat 21 has a vertical sleeving tube 22. The top of the sleeving tube 22 is expanded to increase the external diameter with a plurality of teeth 23 annularly arranged in the inner rim thereof. A hollow toothed ring 24 has the inner contour matching the shape of the tube of the frame 13 and sleeves the tube of the frame 13. The lower end of the toothed ring 24 is expanded to form a circular shape and increase the external diameter with a plurality of teeth 25 annularly arranged in the inner rim thereof. The teeth 25 engage with the teeth 23 so that the wheel seat 20 can be rotated inward and folded up within the frame 13.

The block board has two lugs 31 respectively arranged at the left and right of the rear side. The lugs 31 accommodate the lower ends of the frame 13. Each lug 31 is pivotally coupled to the corresponding lower end of the frame 13 by a bolt 32 and a nut 33. Thus, the block board 30 may be either vertical to the frame 13 or lifted upward to contact the front side of the frame 13.

When in use, the block board 30 is pulled down to be vertical to the frame 13 for supporting goods, and the wheels 20 are rotated outward to be below the frame 13. The position-limiting sleeves 15 are pulled down to wrap the plug elements 121 and the pivotal elements 131, and the holder segment 12 and the frame 13 are thus confined to a straight line. Then, the hands hold the connection rod 11 to push the handcart.

When not in use, the block board 30 is lifted up to contact the front side of the frame 13, and the wheels are rotated inward and folded up within the frame 13. The position-limiting sleeves 15 are pushed up to reveal the plug elements 121 and the pivotal elements 131, and the holder segments 12 can thus be folded down to contact the rear side of the frame 13. Thereby, the volume of the handcart can be reduced to facilitate storage or convenience lifting the handcart with a hand to carry about.

The sample handcarts fabricated according to the specification and drawings of the present invention have been tested many times. It is proved that the present invention can indeed achieve the expected objectives. Besides, none identical or related product has appeared in documents or the market when the present invention is filed. Thus, the Inventor files a patent application for the present invention.

Those described above are only the preferred embodiments to exemplify the present invention but not intended to limit the scope of the present invention. Any equivalent modification or variation according to the spirit of the present invention is to be also included within the scope of the present invention.

What is claimed is:

1. A handcart with a foldable handle structure, comprising the following components:
   a holder segment including a pair of parallel tubes respectively arranged at the left and the right and a horizontal connection rod connecting with the pair of said tubes, wherein the bottom of each said tube sleeves a plug element, and the lower portion of said plug element has a slot, and a pivotal hole, which is to be inserted by a bolt, horizontally passes through the lower portion of said plug element;
   a frame including a pair of tubes respectively arranged at the left and the right, wherein the top of each said tube sleeves a pivotal element, the top of said pivotal element is pivotally coupled to a rotary plate-like insert element, and said insert element is inserted into said slot of said plug element, and said bolt horizontally penetrates said pivotal hole to pivotally couple said plug element to said pivotal element;
   two position-limiting sleeves respectively sleeving said tubes of said holder segment and capable of being moved downward to wrap said plug elements and said pivotal elements;
   a pair of wheels each pivotally coupled to a wheel seat assembled to below said frame; and
   a block board pivotally coupled to below said frame and vertical to said frame.

2. The handcart with a foldable handle structure according to claim 1, wherein the cross sections of said tubes of said holder segment and said frame has an elliptic shape, and the inner contour of said position-limiting sleeve matches the sectional shape of said tube of said holder segment.

3. The handcart with a foldable handle structure according to claim 1, wherein the rear side of said block board has two lugs respectively arranged at the left and the right, and each said lug accommodate one lower end of said frame; said block board is pivotally coupled to the lower ends of said frame via inserting a bolt through said lug and the lower end of said frame and fixing said bolt with a nut.

4. The handcart with a foldable handle structure according to claim 1, further comprising a hollow toothed ring, wherein said toothed ring has the inner contour matching the shape of said tube of said frame and sleeves said tube of said frame; the lower end of said toothed ring is expanded to form a circular shape and increase the external diameter thereof with a plurality of teeth annularly arranged in the inner rim thereof; one side of said wheel seat has a circular sleeving tube sleeving the lower portion of said tube of said frame; the top of said sleeving tube is expanded to increase the external diameter thereof with a plurality of teeth annularly arranged in the inner rim thereof; said teeth engage with said teeth.

5. The handcart with a foldable handle structure according to claim 1, wherein the positions of said plug element and said pivotal element can be exchanged to have asymmetric left and right pivotal joints between said holder segment and said frame.

6. The handcart with a foldable handle structure according to claim 1, wherein at least one horizontal rod is fixedly installed in said frame.

* * * * *